(12) United States Patent
Clancy

(10) Patent No.: US 8,885,728 B2
(45) Date of Patent: Nov. 11, 2014

(54) DECODING APPARATUS FOR A SET-TOP BOX

(75) Inventor: Paul A. Clancy, Duluth, GA (US)

(73) Assignee: General Instrument Corporation, Horsham, PA (US)

( * ) Notice: Subject to any disclaimer, the term of this patent is extended or adjusted under 35 U.S.C. 154(b) by 658 days.

(21) Appl. No.: 12/578,022

(22) Filed: Oct. 13, 2009

(65) Prior Publication Data

US 2011/0085600 A1      Apr. 14, 2011

(51) Int. Cl.
| | |
|---|---|
| *H04N 7/12* | (2006.01) |
| *H04N 21/4402* | (2011.01) |
| *H04N 21/41* | (2011.01) |
| *H04N 21/434* | (2011.01) |

(52) U.S. Cl.
CPC ... *H04N 21/440218* (2013.01); *H04N 21/4104* (2013.01); *H04N 21/434* (2013.01)
USPC .................................................. 375/240.25

(58) Field of Classification Search
USPC ........................................ 375/240.01, 240.25
IPC ........................................................ H04N 7/12
See application file for complete search history.

(56) References Cited

U.S. PATENT DOCUMENTS

| | | | |
|---|---|---|---|
| 2006/0039559 | A1 | 2/2006 | Wasilewski |
| 2006/0053457 | A1 | 3/2006 | Guenebaud |
| 2007/0204286 | A1 | 8/2007 | Candelore |
| 2008/0008457 | A1* | 1/2008 | Ando et al. .................... 386/126 |
| 2008/0263621 | A1* | 10/2008 | Austerlitz et al. ............. 725/139 |
| 2009/0031419 | A1* | 1/2009 | Laksono .......................... 726/21 |
| 2010/0020811 | A1* | 1/2010 | Candelore et al. ............. 370/400 |
| 2010/0138857 | A1* | 6/2010 | Gondkar .......................... 725/31 |
| 2010/0162289 | A1* | 6/2010 | Sanders .......................... 725/23 |
| 2010/0228610 | A1* | 9/2010 | Kaftan .......................... 705/14.4 |
| 2010/0313236 | A1* | 12/2010 | Straub ........................... 725/146 |

FOREIGN PATENT DOCUMENTS

EP          2088780 A1      8/2009

OTHER PUBLICATIONS

PCT Search Report & Written Opinion, Re: Application #PCT/US2010/049419; Jan. 31, 2011.

* cited by examiner

*Primary Examiner* — Dave Czekaj
*Assistant Examiner* — Tracy Li
(74) *Attorney, Agent, or Firm* — Lori Anne D. Swanson

(57) ABSTRACT

A decoding apparatus includes at least one data input terminal receiving a program transport stream from an external set-top box. A decoder decodes the program transport stream and a data output terminal outputs the decoded content to an external device. The program transport stream is the same transport stream received by the external set-top box from a service provider.

6 Claims, 5 Drawing Sheets a
DECODING APPARATUS FOR A SET-TOP BOX

BACKGROUND

When transmitting content from a content provider to a subscriber in an encoded format, such as television programs streamed to a subscriber's set-top box via cable, the content has to be decoded at the set-top-box to be viewed by the subscriber.

As audio-video (AV) encoding standards evolve, compatibility with existing set-top box populations becomes problematic. For example, a content provider may wish to utilize the improved encoding standard of Motion Picture Expert Group 4 (MPEG4), while a portion of the set-top box population is only configured to decode content based on the earlier Motion Picture Expert Group 2 (MPEG2) standard.

One solution is to duplicate content on the network, broadcasting some content in more than one format. For example, content may be sent in both MPEG2 and MPEG4 formats. Perhaps MPEG4 encoding would be used for high definition (HD) content, while MPEG2 could be used for standard definition (SD) versions of the same content. However, this solution does not realize the full bandwidth benefits of the better encoding format; additionally some viewers will not be getting the benefit of the better encoding standard.

Another solution is to upgrade older set-top boxes with a transcoding unit. A transcoding unit can convert between encoding formats, it would output in a format compatible with the set-top box. For example, a transcoder could convert content from MPEG4 to MPEG2 encoding, so that the set-top box can decode from the MPEG2 standard. However, the transcoding process may introduce a loss of quality, it will also add delay, and a transcoding unit with current technology is expensive.

SUMMARY

A decoding apparatus enabling an external set-top box to support different encoding standards is provided. The decoding apparatus includes at least one data input terminal receiving program transport streams from an external set-top box. The decoding apparatus also includes a demux demultiplexing the program transport streams to select a program transport stream that is encoded based on a first encoding standard. A decoder decodes the selected program transport stream based on the first encoding standard, and a data output terminal outputs the decoded content to an external device. The program transport streams are the same transport streams received by the external set-top box from a service provider and are not decoded by the external set-top box.

The decoding apparatus allows an existing set-top box to provide users of the decoding apparatus the ability to view content encoded based on an encoding standard that is not supported by the set-top box. Therefore, there is no need to upgrade the existing set-top box or buy an additional set-top box supporting the encoding standard. Another advantage is that the decoding apparatus may utilize video outputs from the existing set-top box to provide an overlay graphic.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

In an embodiment of the present invention, an expansion option for an existing set-top box is provided by using an external decoding apparatus. The external decoding apparatus decodes content of a program that is encoded based on different encoding standards. The external decoding apparatus allows a set-top box to support different encoding standards (or higher data rates of a standard) that the set-top box is not able to decode. A set-top box is a device that connects to an external device and an external source of a signal. Typically, the external device is an end user device, such as a TV or a computer monitor. The set-top box receives encoded content in transport streams and decodes the content for viewing at the end user device, such as a TV connected to the set-top box. Examples of set-top boxes are a cable set-top box or an Internet Protocol (IP) set-top box. Content may include video, audio, Internet web pages, interactive games, or other data. Also, note that the decoding apparatus is referred to herein as "external."

Figure 1:
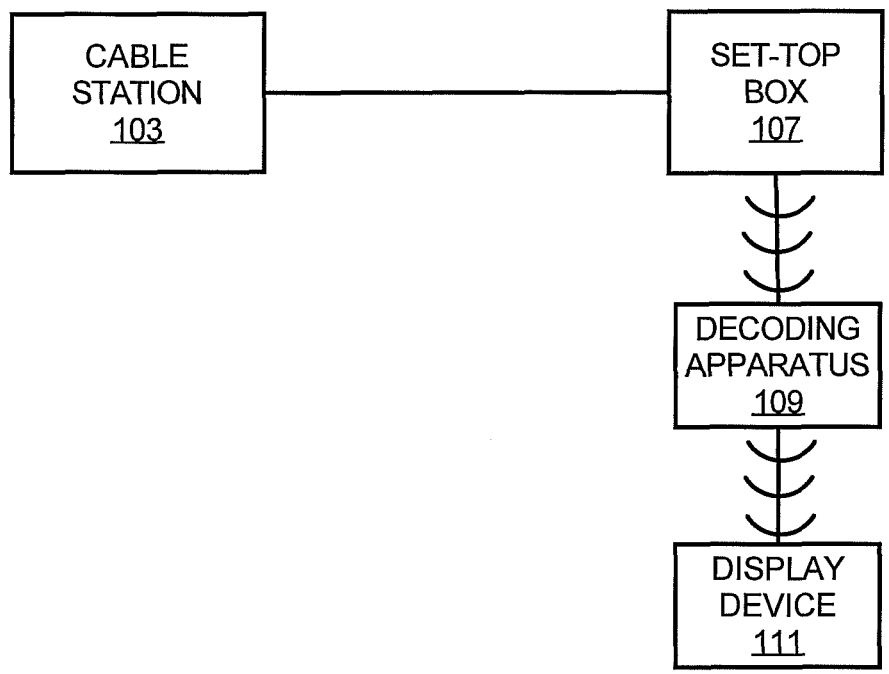
FIG. 1 shows a diagram of a content transmission system, according to an embodiment of the present invention.

FIG. 1 shows a diagram of a content transmission system 100, according to an embodiment of the present invention. A cable station 103 may transmit a plurality of program transport streams to a set-top box 107. Program transport streams include any audio or video data or information, such as streamed audio services, streamed video services, and streamed data services or files. The cable station 103 may be managed by a service provider, such as the Comcast® or Verizon™ communications.

As referred herein, a service provider is an individual, a group of individuals, a company, a corporation, or any other entity that distributes content to one or more users. Examples of service providers are Cable TV (CATV) service provider, satellite TV service provider, satellite radio service provider, wireless mobile service provider, and online music providers or companies. In turn, the service providers receive content from one or more content providers (not shown), such as film studios, record companies, television broadcasting networks, etc. It should be noted that a content provider is also operable as a service provider to directly provide its content to users in the same manner as the service provider.

As also referred herein, an end user is an individual, a group of individuals, a company, a corporation, or any other entity that purchases, subscribes, or is authorized otherwise to receive access to one or more particular content services.

Examples of end users include but are not limited to CATV subscribers, satellite TV subscribers, satellite radio subscribers, IPTV subscribers, and Pay-Per-View (PPV) purchasers of PPV events. As also referred herein, a PPV event is a particular content program for which a user is charged to view.

As further referred herein, an end user device is that device used to access content provided by a service provider (or content provider), which content the user has authorization to access. Examples of end user devices include, but are not limited to CATV, satellite-TV, personal computer, mobile handsets, and portable media players. It should be noted that a device is operable as either a stand-alone unit (e.g., a digital screen and a computer monitor) or an integral part of a content-viewing device, such as a television with a built-in CATV receiver.

Different program transport streams may be encoded based on different encoding standards. The different encoding standards for digital audio and video file may include different Motion Picture Expert Group (MPEG) standards, such as MPEG2 and MPEG4 standards. The different encoding standards for digital audio file may include, MP3, Advanced Audio Coding (AAC) and Dolby Digital Plus (DDP). Once the program transport streams are transmitted to the set-top box 107, the set-top box 107 may decode each of the plurality of program transport streams before the set-top box 107 outputs content to an end user device so that the end user device may display the content. However, the set-top box 107 may not have a decoder to decode a certain type of data that is encoded based on a particular type of an encoding standard.

For example, if the set-top box 107 only includes an MPEG2 decoder chipset, the set-top box 107 may only decode program transport streams that are encoded based on the MPEG2 standard. Thus, if a program transport stream encoded based on the MPEG4 standard is transmitted to the set-top box 107, in this example, the set-top box 107 sends the program transport stream encoded based on the MPEG4 standard to a decoding apparatus 109. The set-top box 107 may send the program transport stream to the decoding apparatus 109 using a wired connection or a wireless transmission. It is the same transport stream received from the cable station 103 and the transport stream has not been decoded or transcoded.

A frequency for a channel of a program transport stream may be selected and demodulated to obtain the program transport stream by the set-top box 107. The program transport stream may contain many programs that are multiplexed together. The set-top box 107 may demultiplex the desired transport stream of the selected frequency creating a single program transport stream (SPTS) prior to sending to the decoding apparatus 109. The set-top box 107 may contain non-volatile memory storage, such as hard drive (not shown) that can store the program stream prior to sending to the decoding apparatus 109. The decoding apparatus 109 includes an MPEG4 decoder chipset. The decoding apparatus 109 then decodes the program transport stream encoded based on the MPEG4 standard. The decoding apparatus 109 outputs the content via typical audio and video outputs to a display device 111. The decoding apparatus 109 may also provide a high definition (HD) output where the set-top box 107 might only have been capable of standard definition (SD) output. Finally, an end user may view the decoded program displayed at the display device 111.

The content transmission system 100 has been described with a reference to the program transport streams received at the decoding apparatus 109 from the set-top box 107. The program transport streams received at the decoding apparatus 109 may be the same program transport streams received at the set-top box 107 from the service provider via the cable station 103. Alternatively, the program transport streams received at the decoding apparatus 109 may be a variation or portion in various formats that the set-top box 107 may use, such as packetized elementary streams (PES) to output to the decoding apparatus 109. PES is a specification defined by the MPEG communication protocol that allows an elementary stream to be divided into packets. The elementary stream is packetized by encapsulating sequential data bytes from the elementary stream inside PES packet headers. A method of transmitting elementary stream data from a video or audio encoder is to create PES packets from the elementary stream data and then to encapsulate these PES packets inside transport stream (TS) packets or program transport stream. Regardless of the fact that the program transport streams have been modified in a different format or not, the program transport streams are not decoded or transcoded before the decoding apparatus 109 receives it.

Embodiments of a system and apparatus in which the system 100 may be employed for allowing a set-top box to support an encoding standard that the set-top box is not able to decode will now be described with respect to the diagrams depicted in FIGS. 2, 3, and 4. It should be apparent to those of ordinary skill in the art that systems 200 and 300, and an apparatus 400 described herein that other elements may be added or existing elements may be removed, modified or rearranged without departing from the scopes of the systems 200 and 300, and the apparatus 400. In addition, the systems 200 and 300, and the apparatus 400 are described with respect to the system 100 by way of example and not limitation, and the systems 200 and 300, and the apparatus 400 may be used in other systems.

Figure 2:
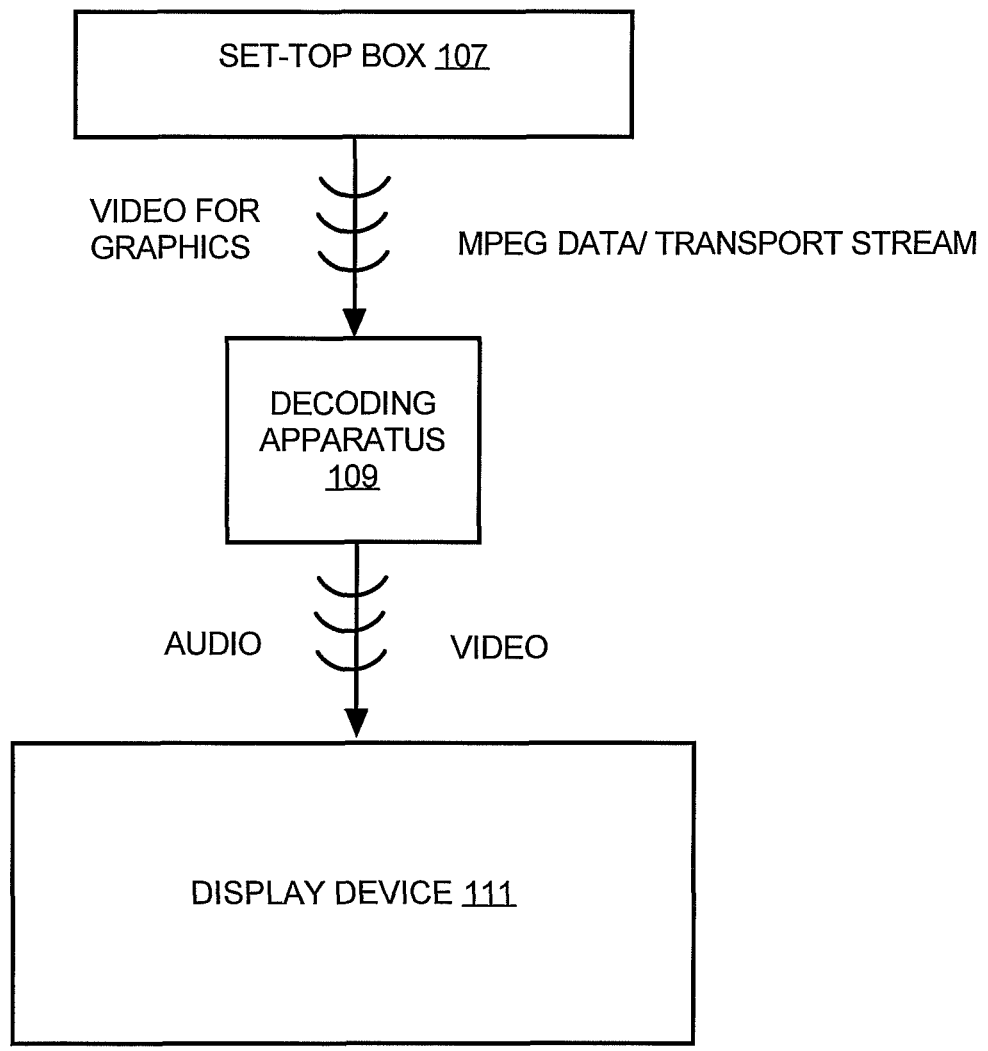
FIG. 2 shows a simplified block diagram of a decoding apparatus system, according to an embodiment of the present invention.

FIG. 2 shows a simplified block diagram of the decoding apparatus system 200, according to an embodiment of the present invention. The decoding apparatus system 200 may be capable of selectively decoding digital content encoded based on different encoding standards.

The decoding apparatus 109 receives a program transport stream (or plurality of program transport streams) from the external set-top box 107. The external set-top box 107 may be a traditional MPEG2 set-top box. As described above, the program transport streams received by the set-top box 107 is sent from a service provider, such as the cable station 103. Each of the program transport streams may be encoded based on different encoding standards. In addition, the program transport streams are not decoded or transcoded prior to the decoding apparatus 109. As mentioned above, "transcoding" is the direct digital-to-digital conversion of one encoding to another. Transcoding is typically a more intensive process than decoding. Further, transcoding chipsets are generally more expensive than the MPEG4 system on chip (SOC).

The decoding apparatus 109 demultiplexes the plurality of program transport streams to select a program transport stream, and the selected program transport stream may be encoded based on an encoding standard that is not supported by the set-top box 107. Demultiplexing is a reverse process of multiplexing, which multiple message signals or digital data streams are combined into one signal over a shared medium. Thus, demultiplexing may extract the original channels on the receiver side, such as the decoding apparatus 109 shown in FIGS. 1 and 2.

A demultiplexer for digital media files is a media file splitter that demultiplexes or splits individual streams of a media file, e.g., audio, video, or subtitles and sends them to their respective decoders for actual decoding. Media file splitter is not a decoder itself, but it separates program streams from a file and supplies them to their respective audio, video, or subtitles decoders, such as an MPEG2 decoder or an MPEG4 decoder.

When a program transport stream arrives at the set-top box 107, it may be encrypted and the set-top box 107 may have a key to decrypt it. To deal with security protocol issues between the set-top box 107 and the decoding apparatus 109, a security protocol the set-top box 107 has may also be used in the decoding apparatus 109 in one embodiment. In this case, the set-top box 107 may not need to decrypt any program transport stream for the decoding apparatus 109. The decoding apparatus 109 may be authorized in the same manner as the set-top box 107. In another embodiment, a standard protocol between the set-top box 107 and the decoding apparatus 109 may be used. For example, the set-top box 107 may support the Digital Transmission Content Protection (DTCP) method or "5C" content protection, which employs the "5C" decryption keys. DTCP utilizes a security engine of the set-top box 107 to decrypt the original program. The set-top box 107 then re-encrypts the program transport stream prior to sending the program transport stream to the decoding apparatus 109 and sends the re-encrypted program transport stream with the 5C decryption keys to the decoding apparatus 109.

The decoding apparatus 109 uses one or more particular decoder chipsets that are able to decode different data encoded based on particular encoding standards to decode the one or more selected program transport streams that carry the different data encoded based on the particular encoding standards. The decoding apparatus 109 then output the content to an external device, such as the display device 111 so that an end user may view the decoded program displayed in the display device 111.

There may be more than one interface between the decoding apparatus 109 and the set-top box 107 configured to transmit the program transport streams from the set-top box 107 to the decoding apparatus 109. The decoding apparatus 109 interfaces with the set-top box via the interface using one or more interfacing devices. Examples of the interfacing devices are Ethernet devices, universal serial bus (USB) cables, RCA connectors, high definition multimedia interface (HDMI) cables, power lines, phone lines, and coaxial cables. The decoding apparatus 109 may also interface with the set-top box via a wireless interface using wireless protocol, such as Bluetooth or wireless LAN. Current data rates of SPTS are typically in the range of 3-15 Mb/s. Since the entire SPTS needs to be passed to the decoding apparatus 109, a connection between the set-top box 107 and the decoding apparatus 109 that supports 20 Mb/s is desirable. As low power chipsets become available, the decoding apparatus 109 may be powered from the set-top box 107, for instance, via a USB connection.

The decoding apparatus 109 may bypass a signal to the display device 111. Here, the term "bypass" may mean that the decoding apparatus 109 does not perform decoding. The content may already have been decoded or generated (for example user Interface screens) by the set-top box 107.

The decoding apparatus 109 may include an overlay circuit and the overlay circuit formats content at any location and size in the display device 111. Here, the term overlay may mean video overlay that displays a video window on display device, such as the display device 111.

In one embodiment, graphics may be received at the decoding apparatus 109 via existing video outputs from the set-top box 107 and merged with content generated from the decoded program transport stream. Additional control signals, such as an overlay control signal may be sent from the set-top box 107 to the decoding apparatus 109. The output at the display device 111 will be a combination of the graphics from the set-top box 107 and the content decoded by the decoding apparatus 109.

In one embodiment, graphics from the set-top box 107 may be received in an encoded format (for example HTML or bitmap data). These may be received on the same interface as the program transport stream. Additional control signals may also be received on the same interface allowing the generation of a user interface within the decoding apparatus 109 to be output to the display device 111.

Figure 3:
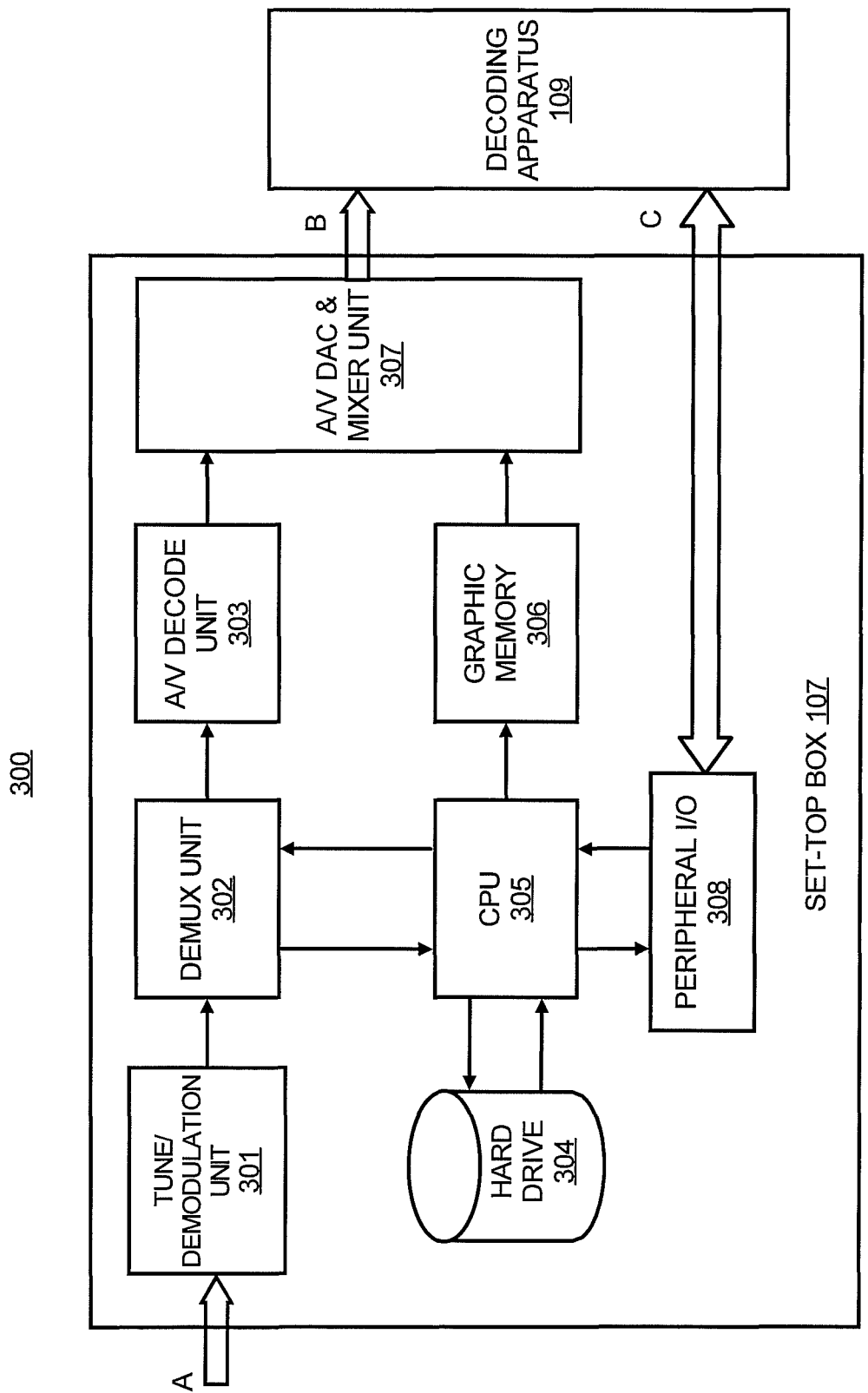
FIG. 3 shows a more detailed block diagram of the decoding apparatus system, according to an embodiment of the present invention.

FIG. 3 shows a more detailed block diagram of the decoding apparatus system 300 depicting the set-top box 107 interacting with the decoding apparatus 109, according to an embodiment of the present invention. FIG. 3 shows a functional blocks of the set-top box 107 depicting how the set-top box 107 may interact with the decoding apparatus 109.

In FIG. 3, the set-top box 107 may include a tune/demodulation unit 301 for tuning or demodulating a plurality of program transport streams from the cable station 103, a demux unit 302 for demultiplexing the desired transport stream of the selected frequency creating a SPTS, an audio/video (N/V) decode unit 303 for decoding the SPTS, a hard drive 304, a central processing unit (CPU) 305, a graphic memory 306, an audio/video (N/V) digital-to-analog converter (DAC) and mixer unit 307, and a peripheral input/output (I/O) 308. In addition, interfaces A, B, and C are shown in FIG. 3. The interface A includes a radio frequency (RF) connection between a cable station, such as the cable station 103, and the set-top box 107. The interface B includes RCA connectors and HDMI cables. The interface C includes Ethernet, USB, etc.

In one embodiment, the set-top box 107 controls the decoding apparatus system 300. Referring to FIG. 3, the decoding apparatus 109 is connected to the set-top box 107 via the A/V DAC and mixer unit 307 and via the peripheral I/O 308. Upon detecting the connection of the decoding apparatus 109 to the set-top box 107, firmware of the set-top box 107 enters a mode of operation utilizing the decoding apparatus 109. In this embodiment, output of the demux unit 302 is no longer routed to the NV decode unit 303. Instead, the output of the demux unit 302 is routed through the CPU 305 to the Peripheral I/O 308 and to the decoding apparatus 109. The set-top box 107 may generate graphical output for user menus, program information screens and TV guide listings, etc. The graphical output appears in a video signal and may be transmitted to the decoding apparatus 109 via the NV DAC and mixer unit 307. The set-top box 107 sends additional control signals to the decoding apparatus 109. The additional control signals control how to combine the graphical output with the output of the demux unit 302, such as a video output that is sent to and decoded in the decoding apparatus 109.

In another embodiment, the decoding apparatus 109 controls the decoding apparatus system 300. Referring again to FIG. 3, the decoding apparatus 109 is connected to the set-top box 107 via the peripheral I/O 308 at interface C. Upon detecting the connection of the decoding apparatus 109 to the set-top box 107, the set-top box 107 acts as a slave to the decoding apparatus 109. In this embodiment, the decoding apparatus 109 takes over control of the functional blocks of the set-top box 107. The decoding apparatus 109 utilizes the functional blocks of the set-top box 107 as needed to perform the front-end functions of tuning and demultiplexing. The hard drive 304 of the set-top box 107 may be utilized for program recording and playback. The decoding apparatus 109 generates graphical output for user menus, program information screens and TV guide listings, etc. Again, the decoding apparatus 109 decodes the video output. The graphical outputs at interface B via the A/V DAC and mixer unit 307 are either turned off or are configured to indicate to the user to use the TV connections on the decoding apparatus 109.

Figure 4:
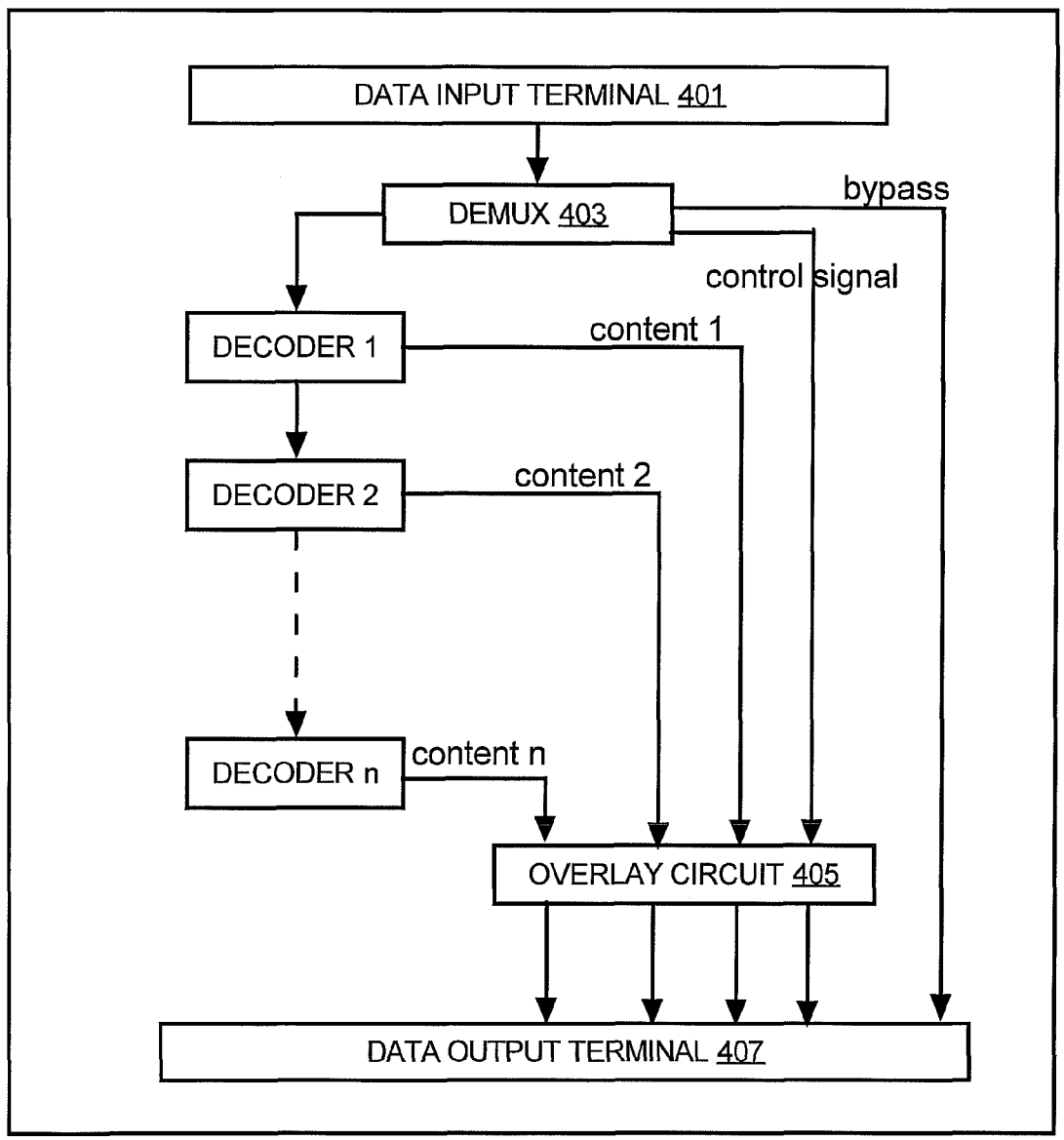
FIG. 4 shows a block diagram of a decoding apparatus, according to an embodiment of the present invention.

FIG. 4 shows a block diagram of the decoding apparatus 400, according to an embodiment of the present invention. The decoding apparatus 400 may be used as the decoding apparatus 109. Although the decoding apparatus 400 described here is a standalone apparatus, the decoding apparatus 400 may be integrated into equipment such as a BluRay DVD player, a DVD player, or a VCR.

The decoding apparatus 400 includes a data input terminal 401. The data input terminal 401 receives one or more program transport streams from the external set-top box 107 shown in FIGS. 1, 2, and 3. The program transport streams are not decoded or transcoded prior to the data input terminal 401. A demux 403 receives the program transport streams from the external set-top box 407 via the data input terminal 401. The demux 403 demultiplexes the program transport streams to select one or more program transport streams. The decoding apparatus 400 further includes at least one decoder, such as a decoder 1, a decoder 2, etc. A particular decoder decodes one or more of the selected program transport streams based on the encoding standard that the decoder supports. For example, the decoder 1 may decode a program transport stream 1 based on the MPEG4 standard that the decoder 1 supports and output content 1. Likewise, the decoder 2 may decode a program transport stream 2 and output content 2.

The decoding apparatus 400 may optionally include a video input terminal (not shown) and an overlay circuit 405 to format some of the decoded program transport streams to display overlay content in the display device 111. A control signal, such as an overlay control signal that may be sent from the set-top box 107 to the decoding apparatus 400 is also shown in FIG. 4. The decoding apparatus 400 also includes a data output terminal 407. The data output terminal 407 outputs one or more decoded program transport streams to an external device, such as the display device 111. The data output terminal 407 may also output the bypassing program content to the display device 111 as illustrated in FIG. 4.

The decoding apparatus 400 may also be used to execute one or more computer programs performing the functions described herein. The computer programs are stored in computer storage mediums. The decoding apparatus 400 may optionally include a main memory (not shown), such as a Random Access Memory (RAM), where software may reside during runtime, and an optional secondary memory (not shown). The optional secondary memory may include, for example, a nonvolatile memory where a copy of software is stored. In one example, the optional secondary memory also includes ROM (read only memory), EPROM (erasable, programmable ROM), EEPROM (electrically erasable, programmable ROM), and other data storage devices, include hard disks. The optional main memory as well as the optional secondary memory may store the program transport streams and the decoded program transport streams.

An embodiment of a method in which the systems 100, 200, and 300, and the decoding apparatus 400 may be employed for decoding a program transport stream will now be described with respect to the flow diagram of the method 500 depicted in FIG. 5. It should be apparent to those of ordinary skill in the art that the method 500 and for other methods described herein that other steps may be added or existing steps may be removed, modified or rearranged without departing from the scopes of the method 500. Also, the methods are described with respect to the systems 100, 200, and 300, and the decoding apparatus 400 by way of example and not limitation, and the methods may be used in other systems.

Figure 5:
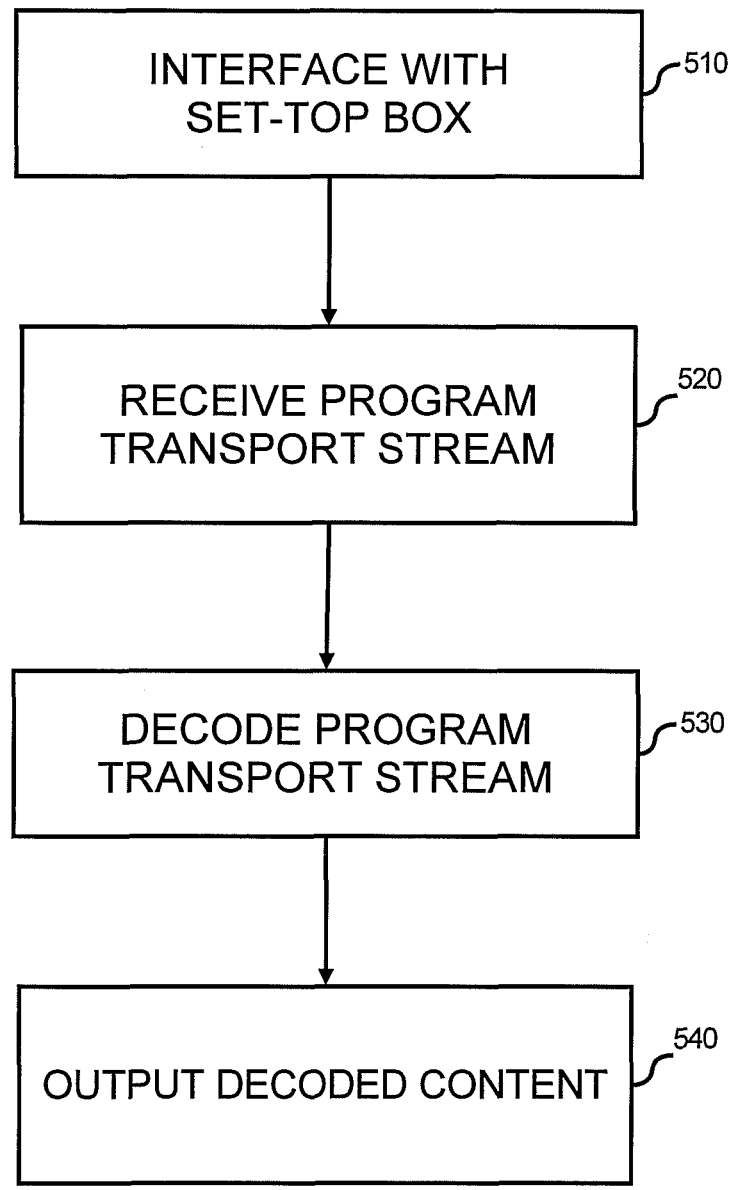
FIG. 5 illustrates a flowchart of a method for decoding a program transport stream, according to an embodiment of the present invention.

FIG. 5 illustrates a flowchart of a method for decoding a program transport stream, according to an embodiment of the present invention.

At step 510, a decoding apparatus, such as the decoding apparatus 400, is interfaced with an external set-top box using an interfacing device.

At step 520, the program transport stream is received at the decoding apparatus from the external set-top box. Here, the program transport stream received at the decoding apparatus from the external set-top box is a same program transport stream received at the external set-top box from a service provider.

At step 530, the program transport stream is decoded at the decoding apparatus.

At step 540, decoded content from the decoded program transport stream is output to a display device.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A decoding apparatus comprising:
   a decoder capable of decoding programs in a first encoded format;
   an interface for enabling control by the compatible external set-top box upon a connection of the compatible external set-top box to the decoding apparatus, wherein in response to a connection of the decoding apparatus to a compatible external set-top box that is capable of decoding programs in a second encoded format but incapable of decoding programs in the first encoded format, a control signal at the interface identifies the decoding apparatus as a slave decoder to the compatible external set-top box;
   a first external input for receiving from the compatible external set-top box a demodulated transport stream that includes a desired encoded program undecoded by the compatible external set-top box and instead routed by the compatible external set-top box to the decoding apparatus for decoding, wherein the decoder decodes the desired encoded program in the first encoded format into content;
   a second external input, not necessarily different from the first external input, for:
      receiving graphics generated by the compatible external set-top box, and
      receiving control signals from the compatible external set-top box that indicate that the graphics are to be overlaid on the content and that indicate how to perform the overlay,
   an overlay circuit for overlaying graphics received from the compatible external set-top box on the content decoded by the decoding apparatus, wherein in response to the identification of the decoding apparatus as a slave decoder to the compatible external set-top box, the overlay circuit combines the graphics and decoded content as directed by the compatible external set-top box in the control signals that indicate how to combine the graphics generated by the compatible external set-top box with the content decoded by the connected decoding apparatus; and a second external output that outputs the content, overlaid by the graphics when the graphics are received, to an external display device.

2. The decoding apparatus of claim 1, wherein the desired encoded program received from the compatible external set-top box has not been transcoded by the compatible external set-top box.

3. The decoding apparatus of claim 1, wherein the desired encoded program is encoded based on Motion Picture Expert Group (MPEG) standards.

4. The decoding apparatus of claim 1, wherein the decoding apparatus is an expansion box that is not in the compatible external set-top box.

5. The decoding apparatus of claim 1 wherein the decoding apparatus is integrated into an end user device performing functions other than decoding.

6. The decoding apparatus of claim 1 further comprising:

a demux that receives more than one encoded program from the compatible external set-top box, and de-multiplexes the more than one encoded program to select a the desired encoded program.

\* \* \* \* \*